July 11, 1944. G. M. REININGER 2,353,586
INCLINOMETER
Filed June 4, 1942

INVENTOR.
Gustave M. Reininger
BY
Murray, Sackhoff & Paddack
ATTY'S

Patented July 11, 1944

2,353,586

UNITED STATES PATENT OFFICE 2,353,586

INCLINOMETER

Gustave M. Reininger, Fort Mitchell, Ky.

Application June 4, 1942, Serial No. 445,823

2 Claims. (Cl. 33—206)

The present invention relates to inclinometers for airplanes, tanks, or the like, and is particularly directed to improvements in inclinometer bulb or tube constructions which facilitate the observation of the inclinometer dial by the pilot of an airplane during night operation when the cockpit is illuminated by artificial light.

An object of the invention is to provide a simplified inclinometer bulb which in use is free from internal light reflections of the source of light in the cockpit which would otherwise interfere with the clear observation of the dial face and the enclosed indicator ball.

Another object of the invention is to provide a simplified inclinometer bulb which will not distort the image of the indicator ball and will be free from undesirable optical conditions.

Another object of the invention is to provide an inclinometer bulb with improved optical features which has a flat dial face and a curved rear wall, said rear wall and the indicator ball having surfaces of contrasting colors so that said ball will be observed in relief in front of the rear wall.

A further object of the invention is to provide an inclinometer bulb which has a transparent dial wall and an opposed luminescent rear wall of flat and curved transverse forms respectively, said bulb enclosing an indicator ball having a light absorptive surface which is interposed between said rear and dial walls to provide improved internal light reflecting characteristics for the bulb and present improved optical conditions therefor for either day or night observation.

Other objects will be apparent from the following specification and drawing, in which.

The general class of inclinometers, to which the device of this invention is related, is mounted on the transverse instrument panel in the cockpit of airplanes or the like and is observed through a dial opening formed in said panel and indicates to the pilot the inclination or "bank" of the airplane, when it is turned to the right or left during flight or may be positioned longitudinally of the cockpit to indicate level flight when the airplane is in rectilinear motion. When the plane is in level flight the indicator ball is positioned substantially centrally of the longitudinal dimension of the inclinometer bulb and is disposed between two stationary hairlines marked on the bulb as is well known in the art.

Figures 1, 2:
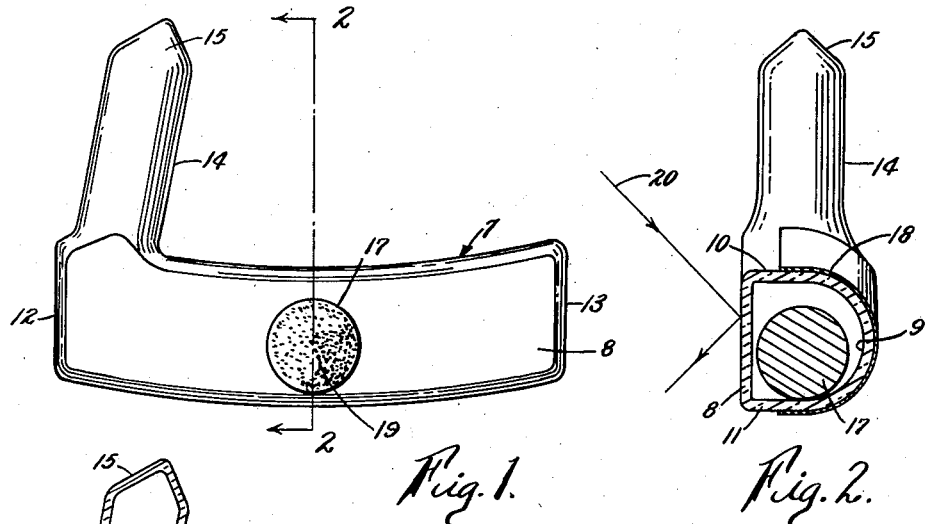
Fig. 1 is an enlarged front elevational view of my inclinometer bulb.
Fig. 2 is a cross-sectional view taken on line 2—2 of Fig. 1.
Figure 3:
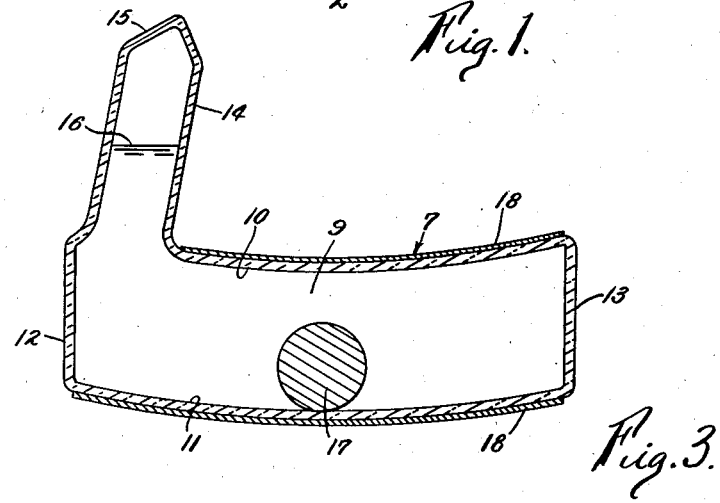
Fig. 3 is a longitudinal, cross-sectional view taken through the center of the inclinometer bulb illustrated in Fig. 1.

The inclinometer bulb illustrated in Figs. 1–3 has a body portion 7 comprising a single piece of transparent material such as glass, "Lucite" or the like, which is free from bubbles or scratches and which may be arcuate shaped in longitudinal extension. The body is hollow and has relatively thin walls and is provided with a transparent flat dial face 8 coextensive with the front part of said body portion, the bulb being positioned behind the instrument panel with said front face adjacent to and observable through the dial opening in the panel. As shown in Figs. 2 and 3, a curved, rear wall 9 extends across the back of the bulb and is integrally joined to the upper and lower margins of the front wall by means of flat walls 10 and 11, respectively.

The transverse ends of the bulb are sealed by integral vertical walls 12 and 13 which join the front, rear, upper and lower walls by smooth curves. A tubular standpipe 14 is integrally formed on the body portion adjacent the end wall 12 and extends upwardly therefrom, the upper end being sealed by an integral and tapered cap portion 15. The bulb is filled with a clear liquid up to a liquid level indicated by reference numeral 16 in Fig. 3. An indicator ball 17 is enclosed within the bulb and immersed in the liquid, said ball having a specific gravity greater than the liquid so that it rests upon the bottom and rolls thereon when the bulb is inclined from the horizontal.

The exterior surface of the curved rear wall and the exterior surfaces of the upper and lower flat walls 10 and 11 adjacent said rear wall are provided with a fluorescent medium 18 which is of a relatively light color and has a comparatively high light reflective characteristic. The fluorescent substance is applied to the rear of the bulb by sandblasting said surface and then applying the substance in fluid form to said surface and which, when dried, serves as a permanent fluorescent background for the indicator ball. The entire spherical surface of the ball 17 has a light absorptive medium 19 applied thereto (Fig. 1) which has a black or other dark color in contrast with the color of the fluorescent substance 18 on the rear wall of the bulb. It is contemplated that the rays of light from a light source in the cockpit of the airplane, such as, an ultra-violet light, will strike the front face 8 of the inclinometer bulb at a small angle of incidence as indicated by line 20 in Fig. 2, said face thus reflecting substantially all of said light rays and permitting only a small amount of said rays to enter the interior of the bulb by refraction through said front wall. The refracted rays will then enter the interior of the bulb and strike substantially the entire curved rear wall, said fluorescent substance diffusing said light rays about the area rearwardly of the indicator ball; the indicator ball having a light absorptive medium thereon will therefore stand out clearly in relief in front of the luminescent rear wall.

A modification of my inclinometer bulb for providing improved optical characteristics of the tube shown in Figs. 1–3 may be obtained by applying a light absorptive medium to the curved rear wall of the bulb instead of the fluorescent substance 18 and the surface of the indicator ball provided with a fluorescent substance of a contrasting color with the light absorptive medium of the rear wall of the tube. The refracted rays which enter the tube under these conditions will be materially dampened by the light absorptive medium on the rear wall of the bulb, thus insuring improved optical conditions for the inclinometer. Furthermore, the fluorescent ball will stand out very clearly before the dark background of the rear wall both for day or night flying operation.

Figures 4, 5:
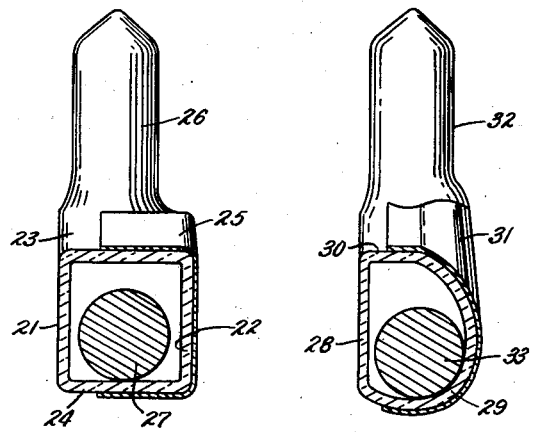
Fig. 4 is a cross-sectional view similar to Fig. 2 showing a modification of the bulb.
Fig. 5 is a cross-sectional view illustrating another modification of the bulb.

As shown in Fig. 4, a modification of my device has a longitudinal configuration similar to that of the bulb shown in Figs. 1–3 and is provided with a flat front face 21 and a flat rear wall 22, said face and wall being integrally joined by a flat upper wall 23 and a flat lower wall 24. The rear wall and a substantial portion of the upper and lower walls are provided on their exterior surface with a light absorptive medium 25. The bulb is provided with a sealed standpipe 26 and a fluorescent ball 27 is enclosed within and immersed in a clear liquid as in the bulb shown in Figs. 1–3.

Fig. 5 illustrates a modified form of bulb which has a flat front 28 and an integral curved rear wall 29 which extends from the lower margin of the front face to a point adjacent the top margin of said front face, said top edge of the rear wall being integrally joined to the top margin of the front face by flat portion 30. This bulb is also provided with a light absorptive medium 31 on the exterior surface of the rear wall and has the standpipe 32 and a fluorescent ball 33 positioned therein.

What is claimed is:

1. An inclinometer comprising a bulb of transparent material formed to provide a flat dial wall co-extensive with the front of said bulb, a curved luminescent rear wall extending completely across the back of the bulb, flat top and bottom walls extending rearwardly from the upper and lower margins respectively of the dial wall and joining the rear wall along its upper and lower margins respectively, walls sealing the ends of the bulb, an uninterrupted coating of fluorescent material covering the rear wall and a substantial part of the top and bottom walls adjacent said rear wall, and an indicator ball in the bulb provided with a light absorptive surface, said fluorescent material, by virtue of the light deflecting relationship of said front and rear walls, being rendered substantially totally luminous by a light source exterior of the bulb whereby the ball is caused to stand out in complete relief against said luminous wall portions.

2. An inclinometer comprising a bulb of transparent material formed to provide a flat side wall co-extensive with the transverse dimension of said bulb, a curved side wall disposed in spaced, parallelism with the flat wall, flat top and bottom walls extending between the upper and lower margins of the flat and curved walls respectively, an uninterrupted coating of fluorescent material covering a side wall and a substantial part of the top and bottom walls adjacent said side wall, and an indicator ball in the bulb provided with a light absorptive surface, said fluorescent material, by virtue of the light deflecting relationship of said side walls, being rendered substantially totally luminous by a light source exterior of the bulb whereby the ball is caused to stand out in complete relief against said luminous wall portions.

GUSTAVE M. REININGER.